United States Patent [19]
Armstrong

[11] Patent Number: 4,736,958
[45] Date of Patent: Apr. 12, 1988

[54] AIR SUSPENSION SYSTEM WITH AUTOMATIC AIR EXHAUST AND INFLATION

[75] Inventor: Theodore E. Armstrong, Muskegon, Mich.

[73] Assignee: Lear Siegler, Inc., Santa Monica, Calif.

[21] Appl. No.: 854,736

[22] Filed: Apr. 14, 1986

[51] Int. Cl.[4] ............................................ B60G 17/00
[52] U.S. Cl. ................................. 280/6 R; 280/711; 280/713
[58] Field of Search ..................... 267/64.16; 280/707, 280/6 R, 6 H, 6.1, 713, 711

[56] References Cited

U.S. PATENT DOCUMENTS

| | | | |
|---|---|---|---|
| 3,332,701 | 7/1917 | Masser | 280/713 |
| 3,406,983 | 10/1968 | Masser | 280/713 |
| 3,547,215 | 12/1970 | Bird | 280/713 |
| 3,765,692 | 10/1973 | Barber et al. | 280/6 R |
| 4,181,324 | 1/1980 | Hixon | 280/713 |
| 4,335,901 | 6/1982 | Gladish | 280/6 R |
| 4,364,574 | 12/1982 | Saito | 280/6 R |
| 4,433,849 | 2/1984 | Ohmori | 280/6 R |
| 4,537,411 | 8/1985 | Naramoto | 280/6 R |
| 4,558,886 | 12/1985 | Straub | 280/6 R |

OTHER PUBLICATIONS

Neway Air Ride, Publication ACN-77-M/S, copyright—1983.
Neway Air Ride, Publication ACN-77-M/S-2, copyright—1982.
Neway Air Ride, Publication AC-77-M/S-1, copyright—1983.
Neway Air Ride, Publication AC-84, copyright—1985.

Primary Examiner—Richard A. Bertsch
Attorney, Agent, or Firm—Varnum, Riddering, Schmidt & Howlett

[57] ABSTRACT

An air control system for an air suspension which supports a vehicle body on an axle having ground engageing wheels. A control valve mounted adjacent a door of the vehicle is operated by opening the door to dump air from the air springs and to deactivate a height control valve for the air springs. Upon closing the door, the control valve disables the dumping system and re-enables the height control valve for automatic reinflation of the air springs.

7 Claims, 1 Drawing Sheet

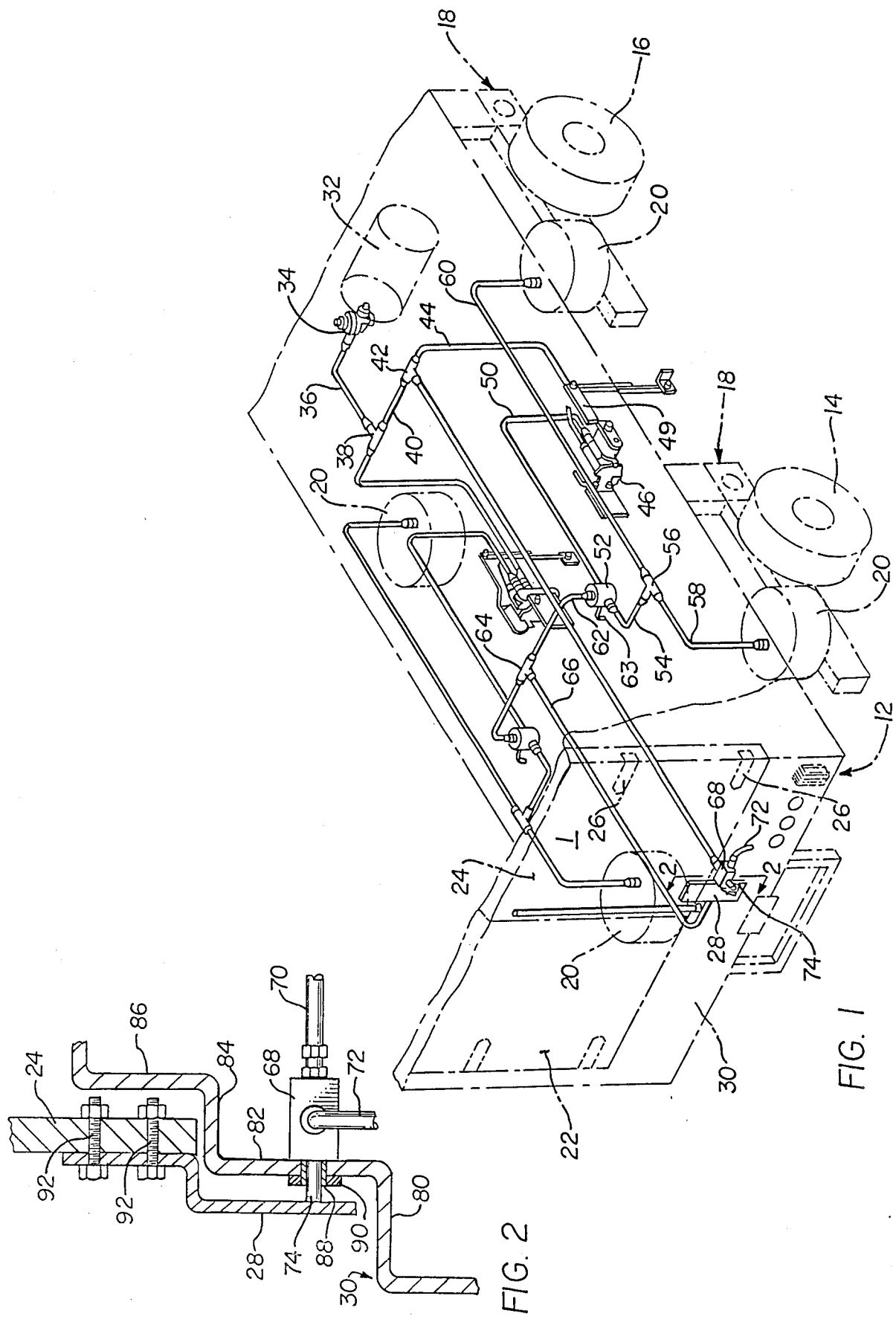

AIR SUSPENSION SYSTEM WITH AUTOMATIC AIR EXHAUST AND INFLATION

FIELD OF THE INVENTION

This invention relates to air suspension systems for vehicles. In one of its aspects, the invention relates to automatic control for an air suspension system for vehicles wherein air is automatically exhausted from air springs prior to loading of the vehicle and air is automatically reinflated into air springs after loading.

BACKGROUND OF THE INVENTION

Many trailer vehicles have air suspension systems which support the vehicle on one or more wheel bearing axles. Examples of such systems are disclosed in the U.S. Pat. Nos. 3,406,983 to Masser issued Oct. 22, 1968, 3,332,701 to Masser issued July 25, 1967 and 3,547,215 to Bird issued Dec. 15, 1970.

Air supply and control systems are provided to inflate the air springs and to maintain the height of the trailer constant with respect to the axles for many different loads. To this end, height control valves are provided to adjust the flow of air to the air springs. When the trailer is being loaded or unloaded, the trailer is usually parked and the compressor is turned off. Loading and unloading usually results in fluctuation of the load due to a lift truck moving into and out of the trailer, thus repeatedly adjusting the air to the air springs. After a certain number of cycles, the air in the surge tank is too low to operate the springs and the air springs at least partially collapse. Due to the fact that the trailer pivot point is usually at the front of the trailer, vertically above the axles and above the pivot point of the suspensions, the back part of the trailer swings downwardly and forwardly as the air springs collapse thereby moving the back part of the trailer away from the loading dock. In addition to providing a gap between the loading dock and the trailer back portion, the movement of the trailer may but additional stress on the lading gears when the tractor is disconnected from the trailer.

Air spring control systems have been heretofore provided with manually operated valves for dumping the air in the air springs. Thus, a driver may exhaust the air from the air springs before backing the trailer to the loading dock. Alternatively, the operator may keep the truck running during loading and unloading. This latter operation can be fairly expensive and may not be particularly convenient for the driver. Typically, the trailers may sit at the loading dock for days before the loading is complete. Whereas the problem described above may be avoided by the manual operation of the dumping valve, it depends on the operator remembering to operate the valve prior to backing to the loading dock and to reactivate the air system when the loading is complete. The operator may not remember to dump the air at an appropriate time or reinflate the air springs at the proper time. Further, operator controlled dumping of air may be illegal in some states.

SUMMARY OF THE INVENTION

In accordance with the invention, a vehicle is provided with a means for automatically dumping air from air springs prior to loading of the vehicle and for automatically reinflating the air spring when loading has been completed. The invention relates to an air suspension system in which a vehicle has a body with at least one door and an air suspension system supports the body on at least one axle. The air suspension system includes a pressure source, air spring means, air pipe means operably connecting the air pressure source with the air spring and a height control valve means in the air pipe means to maintain the vehicle body at a predetermined height with respect to the axle. Means are provided to selectively exhaust air from the air spring means and simultaneously disable the height control valve means.

According to the invention, an actuation means is cooperatively associated with the door and the selective exhaust means for activating the selective exhaust means to exhaust air from the air spring means and to disable the height control valves when the door is open. Conversely, the actuation means deactivates the selective exhaust means when the door is closed so that air is reinflated into the air spring means and the height control valve is enabled to maintain the predetermined height of the vehicle body with respect to the axle.

The selective exhaust means preferably comprises a two way valve mounted on the vehicle body adjacent the door and the actuation means comprises a movable valve actuator member which is adapted to move between two positions corresponding respectively to the first and second position of the two way valve. The actuation means, in one aspect of the invention, comprises an element on the door in registry with the movable valve member when the door is closed to force the movable valve member from the first to the second position. Desirably, the door element comprises a plate on the door. In a preferred embodiment of the invention, the two way valve is mounted to a rear deck of the vehicle body beneath a rear door and the door plate extends downwardly of the rear door to engage the movable valve actuation member.

BRIEF DESCRIPTION OF THE DRAWINGS

The invention will now be described with reference to the accompanying drawings in which:

FIG. 1 is a perspective view in schematic form of an air control system according to the invention as installed on a vehicle trailer which is shown in phantom lines; and FIG. 2 is a partial sectional view taken along lines 2—2 of FIG. 1.

DETAILED DESCRIPTION OF THE DRAWINGS

Referring now to the drawings, and to FIG. 1 in particular, there is shown in phantom lines a trailer body 12 having ground-engaging wheels 14 and 16 which are connected to the trailer body through an air suspension 18. Air springs 20 are provided on each of the suspension systems to cushion the movement of the axles with respect to the trailer body. The suspension systems to which this invention is applicable will ordinarily be trailing arm suspensions, such as disclosed in the U.S. Pat. No. 3,406,983 to Masser, issued Oct. 22, 1968, or the U.S. Pat. No. 3,547,215 to Bird, issued Dec. 15, 1970, or the U.S. Pat. No. 3,332,701 to Masser, issued July 25, 1967. One type of suspension system of this type is sold under the mark AR-90 by Neway Division of Lear Siegler, Inc., of Muskegon, Mich., U.S.A.

The trailer body is of conventional design and has a pair of rear doors 22 and 24 which are supported on hinges 26. An actuating plate 28 is mounted to the bottom portion of rear door 22 and extends below the bottom of the door adjacent to a rear deck 30 of the trailer body 12.

The schematic system for supplying air to the air springs 20 comprises an air tank 32 which is supplied with air through a compressor (not shown). The air tank 32 is in communication with the air springs 20 through a regulator valve 34, air pipe 36, T-connector 38, air pipe 40, T-connector 42, air pipe 44, height control valve 46, air pipe 50, pilot valve 52, air pipe 54, T-connector 56 and air pipe 58. The air supply system includes a single air tank 32 which supplies air to separate air springs for the suspension systems on each side of the vehicle. For purposes of brevity, only the piping and valve arrangement for one side of the vehicle only will be described. It should be understood that the piping and valve arrangement for the opposite side is identical. The height control valve 46 has an exhaust pot 48 and a control arm 49 to control the flow of air through the control valve 46 to the air springs 20. To this end, the control arm 49 is mounted to a movable portion of the suspension system, either the trailing arm or the vehicle axle, to measure the height of the trailer frame with respect to the vehicle axle. Height control valves are well known and are disclosed and claimed, for example, in the U.S. Pat. No. 3,858,903, to Henry et al, issued Jan. 7, 1975, and in the U.S. Pat. No. 3,884,454 to Passmore, issued May 20, 1975.

The pilot valve 52 is a pilot-operated valve which is normally open to allow the air pressure to pass between air pipes 50 and 54. Pivot valve 52 has an exhaust port 63 which is connected with the air pipe 54 when the valve 52 is actuated to move to a second position. The operation of the pilot valve 52 is controlled by air pressure supplied through air pipe 62 which is connected to the air tank 32 through T-connector 64, air pipe 66, push-button valve 68, air pipe 70, T-connector 42, air pipe 40, T-connector 38, air pipe 36 and regulator valve 34. The valve 52 is plumbed so that it is normally open to pass air between the air pipes 50 and 54 in the absence of any air pressure in the air pipe 62. The pilot valve 52 and the push button valve 68 along with the associated air pipes form a means to selectively exhaust air from the air springs 20 and to simultaneously disable the height control valve 46. The manner in which this function is carried out by these valves will be described later.

The push-button valve 68 is plumbed to be normally open, that is, with open communication between air pipes 66 and 70. The push-button valve 68 has a movable valve actuator member in the form of a spring-loaded actuator button 74 which, when retracted, moves the valve from a first position, establishing communication between air pipes 66 and 64, to a second position to close the connection between the air pipes 66 and 64 and to open the connection between air pipe 66 and an exhaust pipe 72. The push-button valve 68 is a conventional two-way push-button valve. An example of a suitable valve is the ARD-214-C valve sold by the ARO Corporation of Bryan, Ohio.

Referring now to FIG. 2, the rear deck 30 of the trailer body has a horizontal portion 80, a vertical portion 82, a horizontal portion 84 and a vertical portion 86 which is conventional in trailer bodies. The push button valve 68 has a threaded fitting 88 which extends through a hole in the vertical portion 82 of the rear deck 30. A nut 90 is threaded onto the threaded fitting 88 to securely mount the push-button valve 68 to the rear deck 30. Actuator button 74 extends through the fitting 88 in registry with the actuating plate 28 on the rear door 24. The actuating plate 28 is securely mounted to the rear door 24 through a pair of bolts 92 or screws. As seen in FIG. 2, the door 24 is in the closed position and the plate 28 is in abutting relationship with the outer end of the actuating button 74 and thereby forces the actuating button 74 inwardly (or to the right as shown in FIG. 2) against the biasing of a spring (not shown) within the valve 68. The actuating plate 28, a door 24 and the actuating button 74 on push button valve 68 are cooperatively associated to provide an actuation means for actuating the selective exhaust means (valves 52 and 68) to exhaust air from the air springs 20 and to simultaneously disable the height control valve 46 in a manner described hereinafter.

Referring again to FIG. 1 as well as to FIG. 2, the operation of the air control system will be described. In normal operation, when the doors 22 and 24 are closed and locked in a conventional fashion, as, for example, when the trailer is traveling from one location to another, the actuator button 74 is forced into the push button valve 68. In this condition, there will be open communication between air pipe 66 and exhaust pipe 72, establishing open communication between the air pipes 54 and 50. Under these circumstances, the air pressure in the springs 20 will be provided from the air tank 32 and the pressure will be regulated by the height control valve 46 to maintain the trailer body at a predetermined height with respect to the axles.

However, when it is desired to load or unload the trailer and the trailer must be backed up to a loading dock, the truck driver will back the trailer up into the general vicinity of the loading dock. The operator will then open the doors 22 and 24 to permit loading or unloading of the trailer. At this time, the actuating plate 28 will release the button 74 to allow the button 74 to extend from valve 68, thereby opening communication between air pipes 66 and 70 and closing communication between air pipe 66 and exhaust pipe 72. At this time, the air pressure in the tank 32 will be applied to the top of pilot valve 52 through air pipe 66, T-connector 64 and air pipe 62. Thus, the communication between air pipes 50 and 54 will be closed and communication will open between air pipe 54 and exhaust port 63. In this fashion, the air in the air springs 20 will be fully exhausted, thereby lowering the trailer frame to a collapsed position on the axles. The operator can then back the trailer up snugly against the loading dock, whereupon loading and unloading can then take place without vertical movement of the trailer with respect to the axle. After the loading is completed and the doors are closed, the push button valve 74 will again be depressed, thereby establishing communication between the air pipe 66 and the exhaust pipe 72. Valve 52 then switches to its normally open position in which air pipes 50 and 54 are in open communication, thereby providing air pressure to the air springs 20 when the compressor is started.

Typically, the loading or unloading will take place over an extended period of time and the tractor engine is typically shut down. The air compressor for the air tank 32 will likewise be shut down at the same time since the air compressor is typically driven by the engine. In the event that the air in the air springs is not exhausted, the trailer is subject to fluctuating loads as, for example, when a fork-lift truck enters and exits from the trailer and as the load is added or taken away from the trailer. The height control valves 46 ordinarily control the height of the trailer to maintain the height at a predetermined level. However, when the compressor is not working, the pressure in air tank 32 will soon drop below an operating level and the height control system will be shut down. Under these conditions, the trailer bed can rotate slightly to move away from the loading dock. The invention prevents the movement of the trailer away from the loading dock during loading and unloading of the trailer.

Although manually or electrically operable valves have been provided in air control systems of this type before, they required an operator control. The operator might wait until the truck was fully backed up to the loading dock or might otherwise forget to reactivate the air control system to reinflate the air springs. With the invention, the deflation and reinflation take place automatically.

The positioning of the valve actuation means at the rear doors insures that the deflation of the air springs and lowering of the trailer take place before the truck is backed to the loading dock and that the reflation of the air control valve starts before the driver starts down along the road. This timing ensures that the operator will be able to bring the trailer body closer to the loading dock.

Whereas the invention has been described with reference to mounting the push button valve 68 beneath the door 24, the valve 68 can be mounted in any location which will permit interaction with either of the doors as they are opened. Thus, the valve 68 can be mounted at the hinge edges of the door or at the top of the doors, if desired. Further, the invention contemplates the use of actuation means other than pneumatic for controlling the exhausting of air from the air springs. For example, electrical switches can be operated upon opening of the door and the pilot valves 52 can be electrical valves controlled by the switches at the rear doors 22 or 24.

Reasonable variation and modification are possible within the scope of the foregoing disclosure and drawings without departing from the spirit of the invention.

What is claimed is:

1. In a vehicle having a body with at least one door and an air suspension system supporting the body on at least one axle, the air suspension system including an air pressure source, air spring means, air pipe means operably connecting said pressure source with said air spring means, and height control valve means in said air pipe means to maintain said vehicle body at a predetermined height with respect to said axle; and means to selectively exhaust air from said air spring means and simultaneously disable said height control valve means;

the improvement which comprises:

actuation means cooperatively associated with said door and said selective exhaust means for activating said selective exhaust means to substantially fully exhaust the air from said air spring means and to disable the height control means when the door is open.

2. A vehicle according to claim 1 wherein said selective exhaust means comprises a two-way valve mounted on said vehicle body adjacent to said door and said actuation means comprising a movable valve actuator member which is adapted to move between two positions corresponding respectively to first and second positions of said two way valve.

3. A vehicle according to claim 2 wherein said actuation means further comprises an element on said door in registry with said movable valve actuation member when said door is closed to force said movable valve actuation member from said first to said second position.

4. A vehicle according to claim 3 wherein said element comprises a plate on said door.

5. A vehicle according to claim 4 wherein said door is mounted to a rear portion of said vehicle, said two-way valve is mounted to a rear deck of said vehicle body beneath said door and said plate extends downwardly of said door to engage the movable valve actuation member.

6. A vehicle according to claim 5 wherein said actuation means are adapted to deactivate said selective exhaust means and to simultaneously enable said height control valve when the door is closed.

7. A vehicle according to claim 1 wherein said actuation means are adapted to deactivate the selective exhaust means and to simultaneously enable the height control valve when the door is closed.

* * * * *